United States Patent [19]
Syed et al.

[11] Patent Number: 6,038,451
[45] Date of Patent: Mar. 14, 2000

[54] LOCATION BASED METHOD OF AND SYSTEM FOR FORWARDING WIRELESS TELEPHONE CALLS

[75] Inventors: Arshad A. Syed, Richardson; Curtis R. Reider, Allen, both of Tex.

[73] Assignee: Integrated Telecom Solutions, Inc., Richardson, Tex.

[21] Appl. No.: 08/878,026

[22] Filed: Jun. 18, 1997

[51] Int. Cl.[7] .................................................. H04Q 7/20
[52] U.S. Cl. ........................................... 455/445; 455/456
[58] Field of Search .................................. 455/445, 456, 455/560, 561, 426, 433, 31.2, 38.1

[56] References Cited

U.S. PATENT DOCUMENTS

| | | | |
|---|---|---|---|
| 5,251,248 | 10/1993 | Tokunaga et al. | 379/58 |
| 5,315,636 | 5/1994 | Patel | 379/58 |
| 5,367,558 | 11/1994 | Gillig et al. | 455/426 |
| 5,375,161 | 12/1994 | Fuller et al. | 455/445 |
| 5,469,496 | 11/1995 | Emery et al. | 455/461 |
| 5,479,408 | 12/1995 | Will | 455/38.1 |
| 5,481,590 | 1/1996 | Grimes | 455/31.2 |
| 5,519,760 | 5/1996 | Borkowski et al. | 379/59 |
| 5,579,375 | 11/1996 | Ginter | 379/59 |
| 5,600,704 | 2/1997 | Ahlberg et al. | 379/58 |
| 5,602,903 | 2/1997 | LeBlanc et al. | 455/456 |
| 5,661,652 | 8/1997 | Sprague et al. | 455/456 |
| 5,673,308 | 9/1997 | Akhaven | 455/461 |
| 5,675,110 | 10/1997 | Koizumi | 455/445 |
| 5,903,833 | 5/1999 | Honnsson et al. | 455/417 |

*Primary Examiner*—Dwayne D. Bost
*Assistant Examiner*—Quochien B. Vuong
*Attorney, Agent, or Firm*—Denise L. Mayfield; Locke Liddell & Sapp LLP

[57] ABSTRACT

A method of and system for processing a telephone call to a wireless telephone number associated with a mobile telephone unit forwards the call to a registered wireline number if the mobile unit is located near the geographic location associated with the wireline number. In response to a call placed to a wireless telephone number, the system determines the geographic location of the mobile unit associated with the wireless telephone number. If the mobile unit is near a registered location, the system forwards the call to the registered wireline number associated with the registered location.

10 Claims, 5 Drawing Sheets

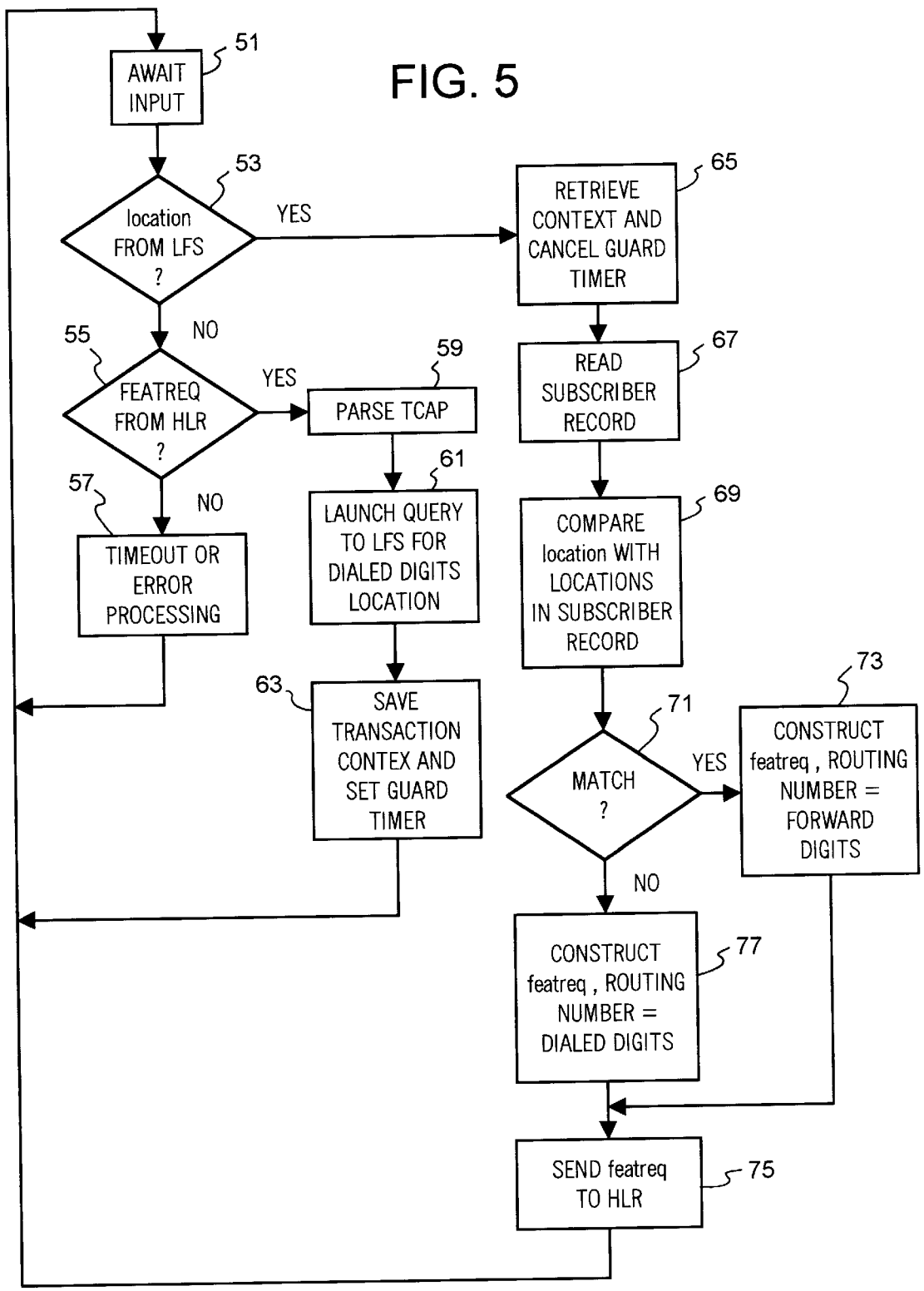

LOCATION BASED METHOD OF AND SYSTEM FOR FORWARDING WIRELESS TELEPHONE CALLS

FIELD OF THE INVENTION

The present invention relates generally to wireless telecommunications, and more particularly to a method of and system for forwarding calls made to a wireless telephone number to a registered wireline telephone number based on the geographic location of the mobile unit associated with the wireless telephone number.

DESCRIPTION OF THE PRIOR ART

People have become increasingly dependant upon the telephone in both their business and personal lives. Many people want or need to be able to make and receive telephone calls not only at their homes and offices but also while traveling, while visiting customer or remote offices, or at virtually any other remote location. Accordingly, wireless telephone services have become very popular.

One of the disadvantages of wireless telephone services is its high cost. Most wireless services charge their subscribers a periodic service charge and a relatively high usage charge. Additionally, a wireless subscriber incurs usage charges for calls made to and from the subscriber's wireless number. Since wireline telephone services typically charge only a periodic service charge with no usage charges for local calls, there is substantial economic incentive for wireless subscribers to use wireline telephone communications as much as possible.

The wireless subscriber can minimize usage charges due to outgoing calls by using wireline telephones. However, the wireless subscriber has much less control over incoming calls. A wireless subscriber can use call forwarding services to forward calls made to the subscriber's wireless number to a wireline number. Once call forwarding is activated, all incoming calls will be delivered automatically to the forwarded number until call forwarding is deactivated or a new destination is entered by the subscriber. Thus, the subscriber eliminates usage charges for incoming calls. However, using standard call forwarding requires a considerable amount of user interaction. The subscriber must remember to activate and deactivate the service.

There is also a "single number service" that is available for both wireless as well as wireline telephone systems. Single number service allows a subscriber to preprogram a list of telephone numbers into the system using their handset or a special subscriber service form. The list allows the subscriber to specify the time of day and day of week applicable for each number in the list. Once activated, calls will be delivered to the number in the programmed list based upon the time of day and day of week. For subscribers with predictable schedules, single number service works fairly well. However, single number service is not particularly useful for subscribers with less predictable schedules.

Another system available to reduce wireless air charges is cordless visitor location register (C-VLR) or ACRE service Akhaven, U.S. Pat. No. 5,073,308 discloses such a system. This service requires a special type of subscriber equipment that is sometimes called customer premise equipment, or CPE. The subscriber equipment includes a special cellular handset and a base or docking station. The subscriber is given a cellular number as well as a wireline number. When the cellular handset is turned on and is within range of the docking station, it automatically becomes a cordless telephone. Any calls coming to the cellular number are automatically routed or delivered to the handset using the wireline or fixed number. When the handset is out of range of the docking station, then incoming calls to the cellular number are completed as wireless calls. Thus, the subscriber has only one number where he or she receives calls. The subscriber saves on air time for incoming calls when within range of the base station. Finally, the service works transparently in that it does not require interaction from the subscriber. A disadvantage of C-VLR service is that it requires special equipment. A further disadvantage is that only one docking station is supported.

Patel, U.S. Pat. No. 5,315,636, and Fuller. et al., U.S. Pat. No. 5,375,161, each disclose systems in which a telephone subscriber has a personal telephone number and carries a "personal communicator." A system of low power radio base stations, separate from the wireless or cellular telephone system monitors the location of the personal communicator. When a call comes into the subscriber's personal telephone number, the system determines which of the subscriber's telephones, including a cellular phone, the personal communicator is near and routes the call to the phone at that location.

It is an object of the present invention to overcome the shortcomings of the prior art. It is a further object to enable a wireless subscriber to only one number where he or she receives calls, regardless of his or her location, without requiring any special equipment. It is a further object to enable a wireless subscriber to save on usage charges for incoming calls, without any time of day or day of week restrictions. It is a further object to provide a location based call forwarding service that works transparently to the subscriber, without requiring any user interaction to activate or deactivate the service.

SUMMARY OF THE INVENTION

Briefly stated, the present invention provides a method of and system for processing a telephone call to a wireless telephone number associated with a mobile telephone unit by forwarding the call to one of a plurality of registered wireline numbers if the mobile unit is located near the geographic location associated with the wireline number. In response to a call placed to a wireless telephone number, the system determines the geographic location of the mobile unit associated with the wireless telephone number. If the mobile unit is near a registered location, the system forwards the call to the registered wireline number associated with the registered location.

The system of the present invention includes a location based call forwarding service that maintains subscriber records, including lists of registered forwarding wireline numbers and the registered geographic location associated with each forwarding wireline number. When the location based call forwarding service receives a request for routing instructions from a mobile system home location register, the location based call forwarding service sends a location query to a location finding service that monitors the location of mobile units. In response to receipt of a location from the location finding service, the location based call forwarding service compares the location received from said location finding service with the subscriber record corresponding to the called wireless number. If the location received from the location finding service is within a preselected distance of one of registered locations, the location based call forwarding service responds to the home location register with forwarding digits. If the location received from the location finding service is greater than a preselected distance of one of registered locations, the location based call forwarding service responds to the home location register with dialed digits.

BRIEF DESCRIPTION OF THE DRAWINGS

FIG. 5 is a flowchart of processing carried out in the location based call forwarding service of the present invention.

DESCRIPTION OF THE PREFERRED EMBODIMENT

Figure 1:
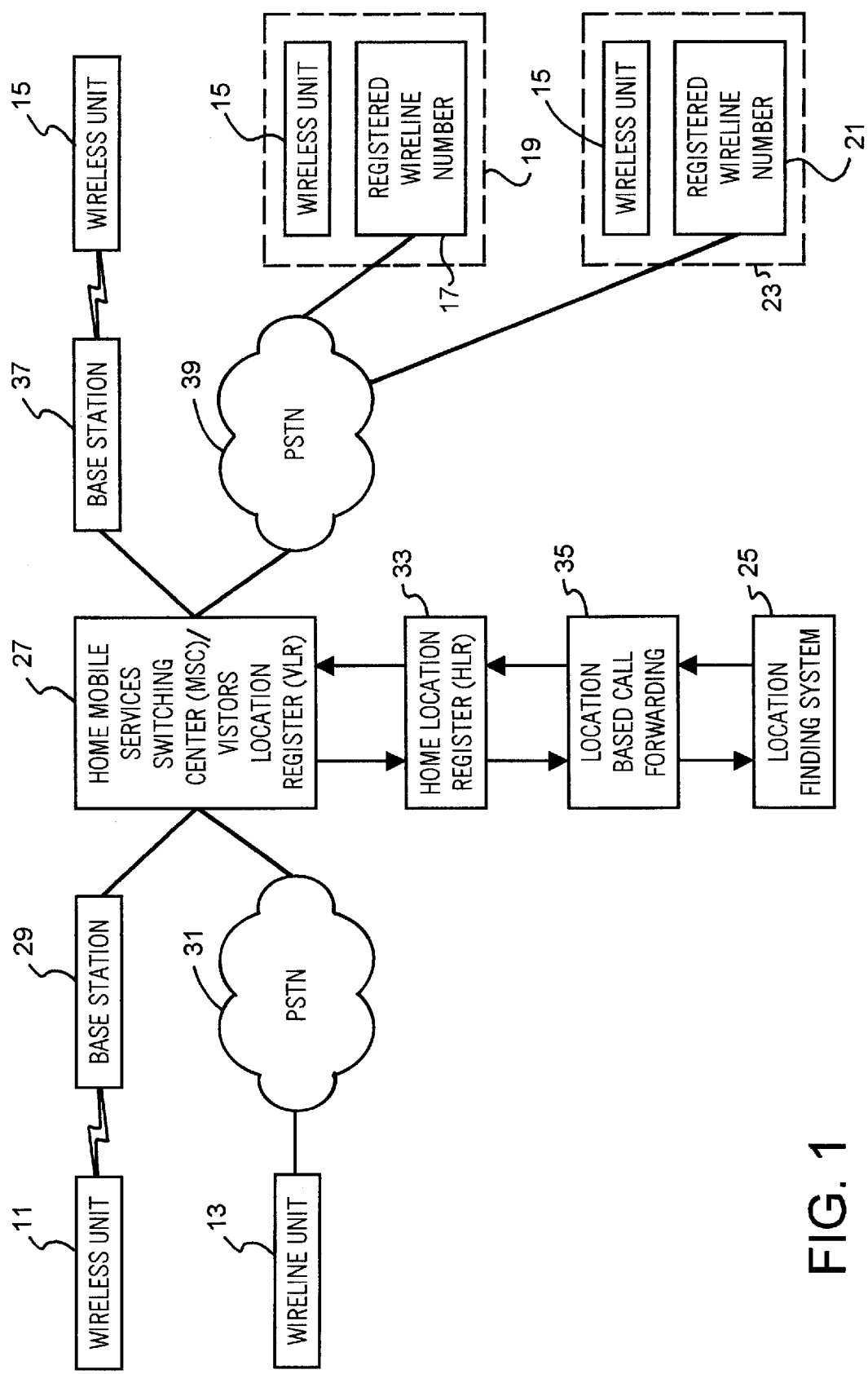
FIG. 1 is a block diagram of a system according to the present invention in a home market.

Referring now to the drawings, and first to FIG. 1, there is shown a block diagram of the completion of a call from a calling party to a called party according to the present invention. The calling party may be either a wireless subscriber placing the call from a wireless unit 11 or from a wireline unit, i.e., standard telephone 13. The called party is a wireless subscriber having a wireless mobile unit 15. Preferably, wireless unit 15 is a small portable cellular telephone that may be carried in a person's pocket, purse, briefcase, or the like. The wireless unit 15 could also constitute a portable personal locator device that does not incorporate a cellular telephone but is designed to work with the present invention. Such a portable personal locator device could be a separate unit, or could be incorporated into a keychain, jewelry, or another device such as a pager.

According to the present invention, a call to the number corresponding to wireless unit 15 may be completed either to wireless unit 15 or to a registered forwarding number according to the location of wireless unit 15. The system of the present invention maintains in a subscriber record for the wireless subscriber a list of registered forwarding number and corresponding registered geographic locations. The registered forwarding numbers may be telephone numbers which correspond to the current location of the subscriber, or may be a telephone number that is at a remote location, such as a voice mail number or an answering service. The registered forwarding number could be any number available from the network, such as any wireline number, another wireless number or a pager number.

In FIG. 1, wireless unit 15 may be located near a first registered wireline number 17 as indicated by dashed block 19, or a second registered wireline number 21, as indicated by dashed block 23. Alternatively, wireless unit 15 may be located within the system's home service area but not near any registered location. While two registered wireline numbers are illustrated in the figures, the service provider may enable as many registered wireline numbers as desired.

The location of wireless unit 15 is monitored by a location finding system 25. Cellular systems have always monitored the location of mobile units, at least to the cell granularity. Due to recent FCC dockets, wireless, and especially cellular, service providers are preparing their networks to support emergency 911 services for cellular subscribers. Wireless 911 is being rolled out in phases, with the key differentiation among the phases being the accuracy of the location of the wireless caller. In order to support the rollout of 911 services for wireless, manufacturers of radio equipment and other wireless technology have developed many types of location finding systems. An example of such a system is disclosed in Borkowski et al., U.S. Pat. No. 5,519,760. Such location finding systems allow the geographic location of a wireless unit to be determined. The location finding systems are part of the network, in that additional subscriber equipment is not required to enable the system. Thus, the location finding systems may be called network location finding systems.

In FIG. 1, a call may be placed to wireless unit 15 by either a wireless unit 11 or wireline unit 13. In the case of a call placed from wireless unit 11, call setup is routed to a home mobile services switching center (MSC) 27 from a wireless system base station 29. Call setup from a wireline unit 13 is routed to MSC 27 through a public switched telephone network (PSTN) 31. In the preferred embodiment, the present invention is implemented using IS-41 messaging. Those skilled in the art will recognize that other messaging systems may be used.

Figure 2:
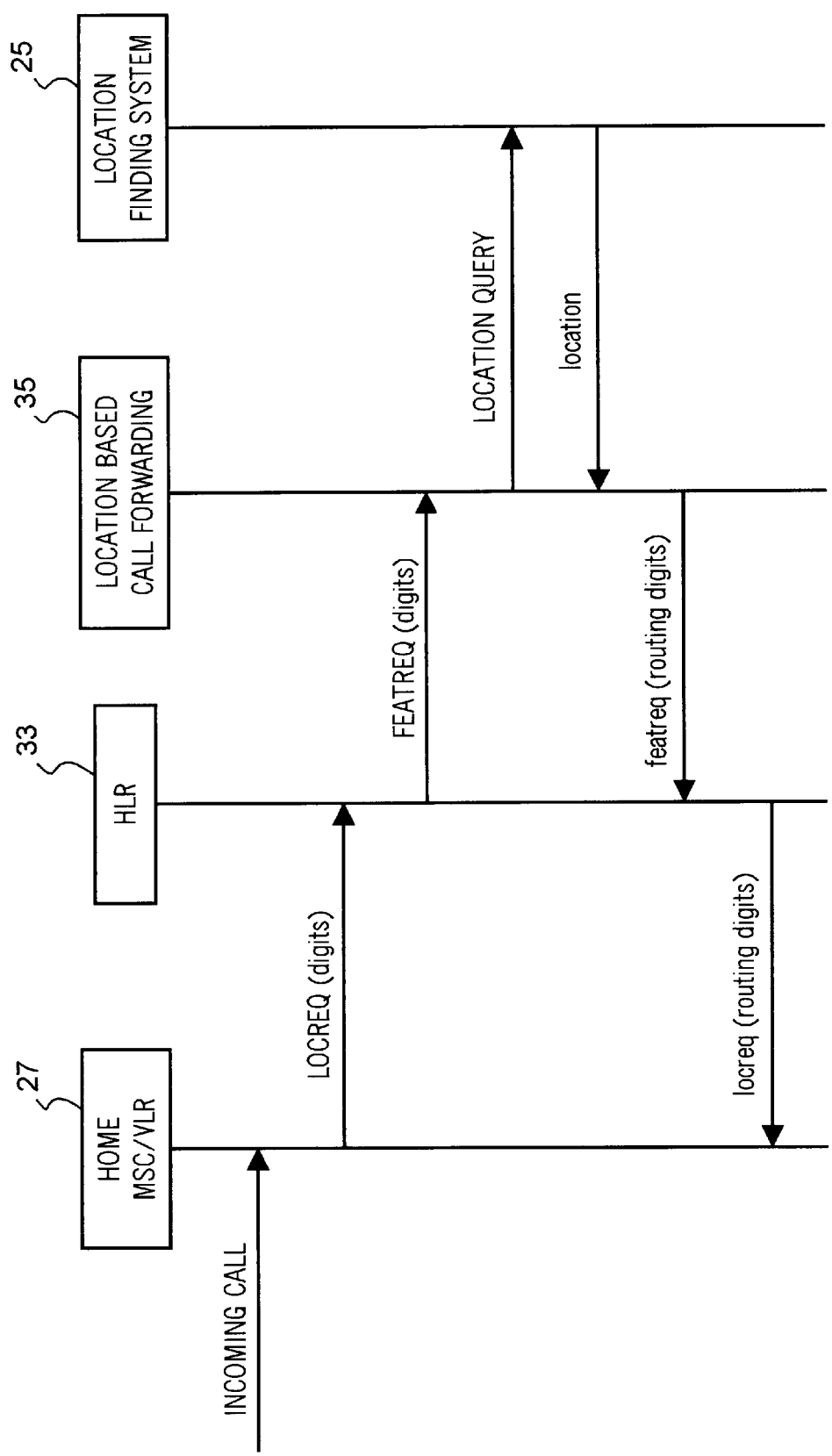
FIG. 2 is a call flow diagram of messaging in the system of FIG. 1.

Referring to FIG. 1 and FIG. 2, upon receipt of a request for call setup, MSC 27 sends an IS-41 location request invoke message to home location register (HLR) 33. A subscriber record in HLR 33 will indicate whether or not the called party is a location based call forwarding subscriber. If so, HLR 33 will send an IS-41 feature request invoke message to a location based call forwarding system 35. As will be explained in detail with respect to FIG. 5, location based call forwarding system will launch a location query to location finding system 25. The interface between the location based call forwarding system and the location finding system may be either a standards based interface, such as transactional capabilities application part (TCAP) or a proprietary interface defined by the vendor of the location finding system. Location finding system 25 responds to the location based call forwarding system with the current or last known location of wireless unit 15.

Upon receipt of the location response from location finding system 25, location based call forwarding system 35 will determine if wireless unit 15 is near a registered wireline number that the calling party has designated for call forwarding. The nearness criteria are based upon the resolution of the location finding system and design choices. Based upon the location of wireless unit 15, location based call forwarding system 35 will return a feature request return result with designated routing digits of either wireless unit 15 or one of registered wireline numbers 17 or 21. Then, HLR 33 will send a location request return result with the routing digits to MSC 27. If the received routing digits are for wireless unit 15, MSC 27 will connect the call through the appropriate base station 37. On the other hand, if the received routing digits are for registered wireline number 17 or 21, MSC 27 will complete the call through a land line telephone system, such as public switched telephone network 39.

Figure 3:
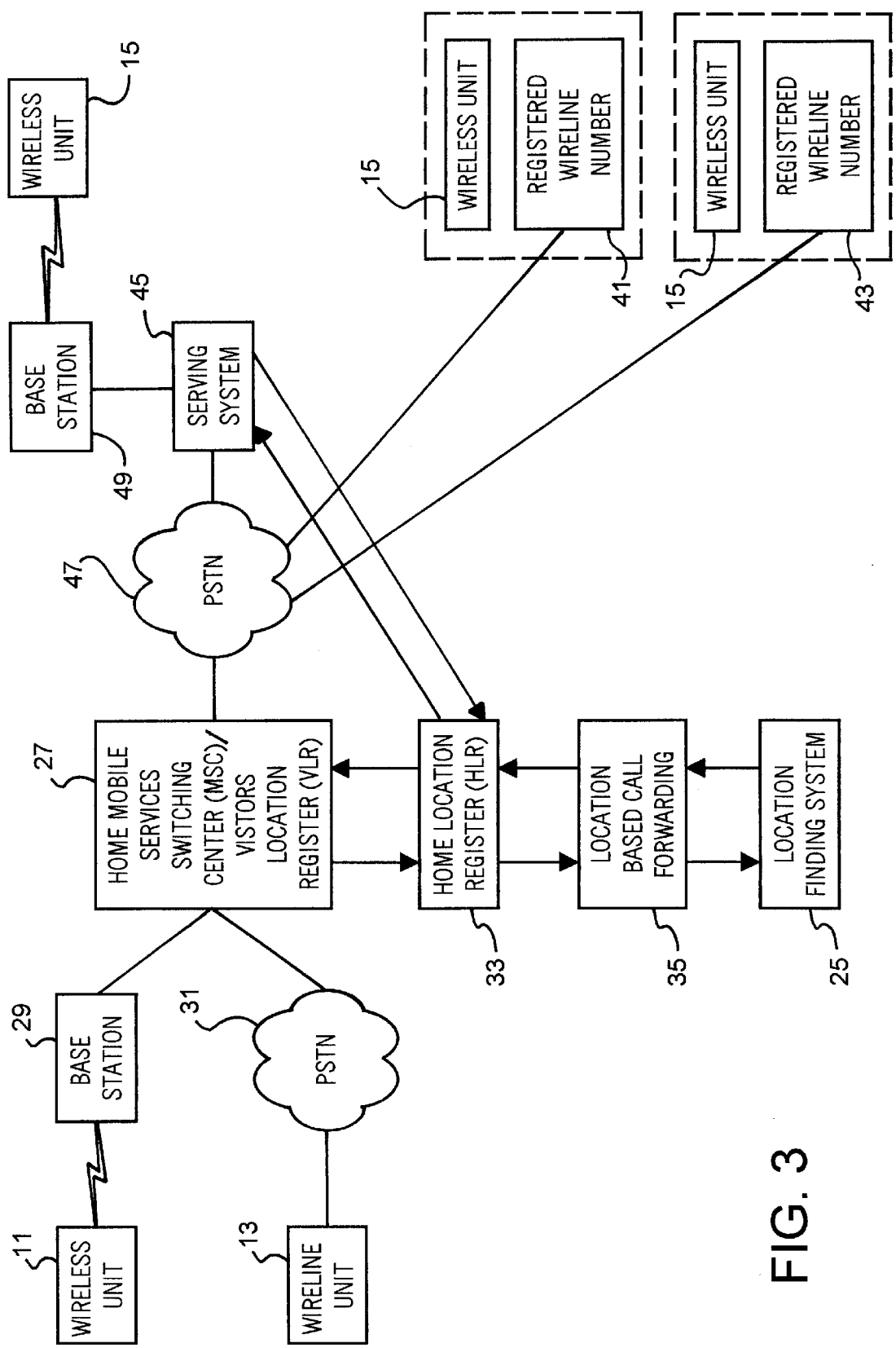
FIG. 3 is a block diagram of a system according to the present invention in a roaming market.
Figure 4:
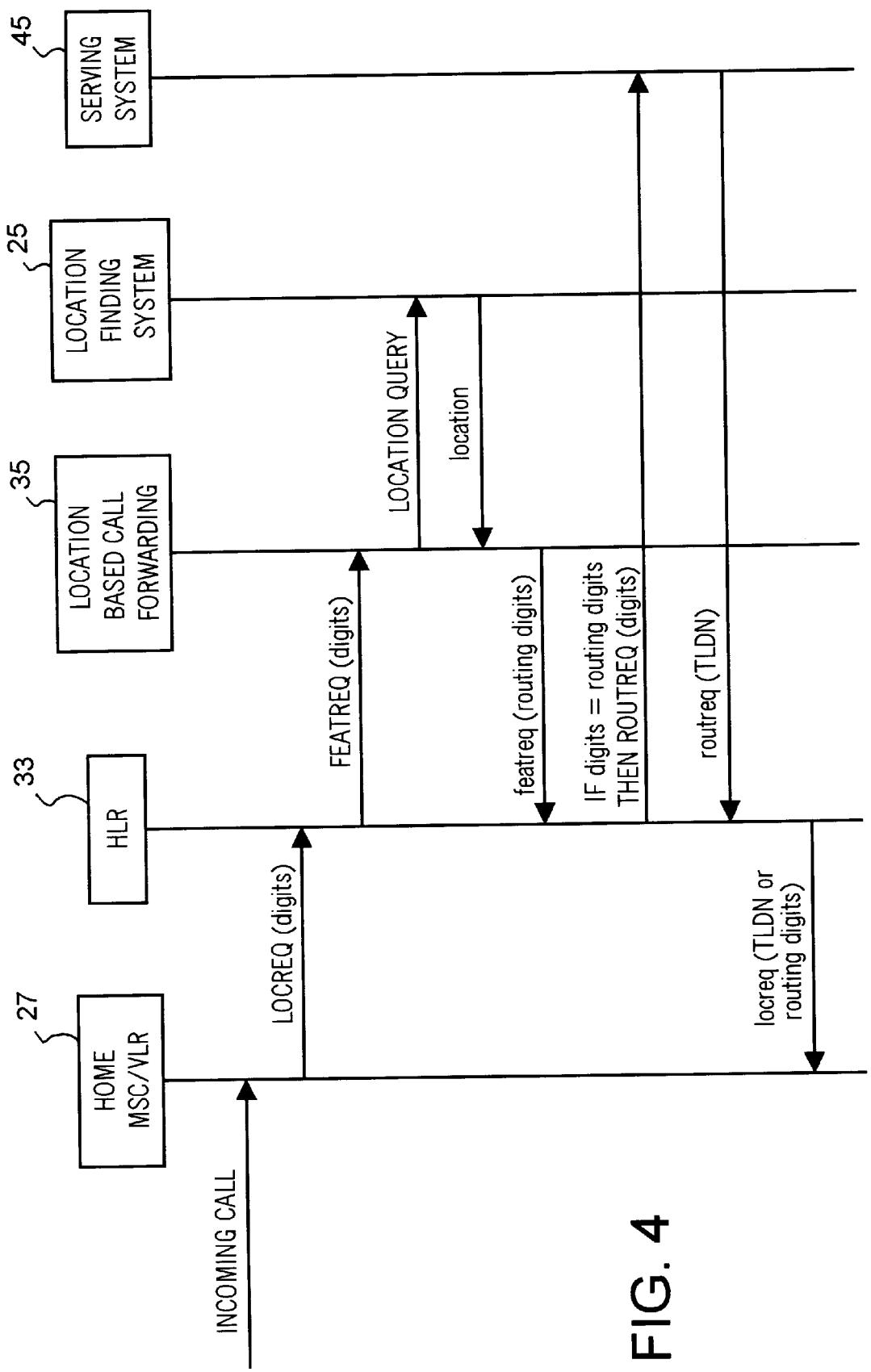
FIG. 4 is a call flow diagram of messaging in the system of FIG. 3.

Referring now to FIGS. 3 and 4, there is illustrated the operation of the system of the present invention wireless unit 15 is located in a roaming market. Again, a call may be placed to wireless unit 15 by either a wireless unit 11, through base station 29, or wireline unit 13, through PSTN 31. In either case, call setup is received at home mobile services switching center (MSC) 27.

Upon receipt of a request for call setup, MSC 27 sends a location request invoke message to home location register (HLR) 33. A subscriber record in HLR 33 will indicate whether or not the called party is a location based call forwarding subscriber. If so, HLR 33 will send a feature request invoke message to a location based call forwarding system 35. Location based call forwarding system will launch a location query to location finding system 25. Location finding system 25 responds to the location based call forwarding system with the current or last known location of wireless unit 15.

Upon receipt of the location response from location finding system 25, location based call forwarding system 35 will determine if wireless unit 15 is near a registered wireline number that the calling party has designated for call forwarding. Based upon the location of wireless unit 15, location based call forwarding system 35 will return a feature request return result with designated routing digits of either wireless unit 15 or one of registered wireline numbers 41 or 43. If the received routing digits are the original dialed digits for wireless unit 15, HLR 33 will send a route request invoke message to the mobile serving system 45 serving roaming wireless unit 15. Serving system 45 will send HLR 33 a route request return result containing a temporary local directory number (TLDN) for wireless unit 15. Then, HLR 33 will send a location request return result with the TLDN, or forwarding routing digits if wireless unit 15 is near a registered wireline unit, to MSC 27. If the received routing digits are a TLDN, then MSC 27 connects the call to wireless unit 15 through a PSTN 47, serving system 45, and an appropriate base station 49. On the other hand, if the received routing digits are for registered wireline 41 or 43, MSC 27 will complete the call through PSTN 47.

Referring now to FIG. 5, there is shown a high level flow chart of the processing performed by location based call forwarding system 35. The system waits for input in the form of either a location return from location finding system 25 or a feature request from home location register 33, at block 51. Upon the receipt of an input, the system tests, at decision block 53, if the input is a location request return result from location finding system 25. If not, the system tests, at decision block 55 if the input is a feature request invoke message from HLR 33. If not, the system performs timeout or error processing, as indicated generally at block 57, and returns to block 51 to await input.

If, at decision block 55, the input is a feature request invoke message, the system parses the message at block 59 and launches a query to the location finding system for the location of the wireless unit corresponding to the dialed digits, at block 61. Then, the system saves the transaction context and sets a guard timer, at block 63, and returns to block 51 to await further input.

If, at decision block 53, the input is a location response, the system retrieves the transaction context, which was saved at process block 63, and cancels the guard timer, at block 65. Then, the system reads the subscriber record for the called wireless unit, at block 67, and compares the location response received from the location finding system with registered locations in the subscriber record, at block 69. If, at decision block 71, there is a match between the location of the wireless unit and a registered location in the subscriber record, the system constructs a feature request return result with a routing number equal to forward digits corresponding to the matched location, at block 73, and sends that feature request response message to the home location register, at block 75. If, at decision block 71, there is no match, then the system constructs a feature request return result with a routing number equal to the dialed digits, at block 77, and sends that feature request return result to the HLR, at block 75.

From the foregoing, it may be seen that the system and method of the present invention offers many advantages over the prior art. The subscriber has only one number where he or she receives calls, regardless of his or her location. The subscriber saves on usage charges for incoming calls when at one of the registered locations, without any time of day or day of week restrictions. The service works transparently to the subscriber based on location, without requiring any user interaction to activate or deactivate the service. The service works with standard commercially available wireless telephones and requires no special equipment. The subscriber's list of registered wireline calls may, and preferably does, contain multiple call delivery numbers.

What is claimed is:

1. A method of processing telephone calls to a wireless telephone number associated with a mobile telephone unit, said mobile telephone unit being located at a geographic location, which comprises the steps of:

in response to a call placed to a wireless telephone number, determining the geographic location of the mobile unit associated with the wireless telephone number;

determining whether the geographic location of the mobile unit associated with the wireless telephone number corresponds to a geographic location of a registered forwarding telephone number; and, forwarding the call to a registered forwarding telephone number corresponding to the geographic location of the mobile unit.

2. The method as claimed in claim 1, wherein said step of determining the geographic location of the mobile unit includes the step of:

querying a network location finding service for the location of said mobile telephone unit.

3. The method as claimed in claim 2, wherein said step of determining whether the geographic location of the mobile unit associated with the wireless telephone number corresponds to a geographic location of a registered forwarding telephone number includes the steps of:

maintaining a subscriber record associated with said wireless telephone number, said subscriber record including a list of registered forwarding telephone numbers and respective associated registered geographic locations;

receiving a location from said location finding service;

comparing the location received from said location finding service with said subscriber record.

4. The method as claimed in claim 3, wherein said step of determining whether the geographic location of the mobile unit associated with the wireless telephone number corresponds to a geographic location of a registered forwarding telephone number includes the further step of:

determining whether the location received from said location finding service is within a preselected distance of one of said registered locations.

5. The method as claimed in claim 1, including the step of completing the call to the wireless telephone number if the mobile unit is located at a geographic location greater than a preselected distance from a registered location.

6. A method of processing telephone calls to a wireless telephone number associated with a mobile telephone unit, said mobile telephone unit being located at a geographic location, which comprises the steps of:

in response to a call placed to a wireless telephone number, querying a network location finding service to determine the geographic location of the mobile unit associated with the wireless telephone number; and, in response to receiving a location from a network location finding service, searching a list of registered geographic locations to determine whether the geographic location of the mobile unit associated with the wireless telephone number corresponds to a geographic location of a registered wireline telephone number.

7. The method as claimed in claim 6, including the step of:

forwarding the call to a registered wireline telephone number if the mobile unit is located within a preselected distance of said registered wireline telephone number.

8. The method as claimed in claim 6, including the step of:

completing the call to the mobile unit if the mobile unit is located greater than a preselected distance from a registered wireline telephone number.

9. A system for processing wireless telephone calls, which comprises:

- a mobile services switching center for routing calls to wireless telephone numbers;
- a home location register for providing routing information to said mobile services switching center;
- a location based call forwarding service, said location based call forwarding service maintaining subscriber records including lists of registered forwarding wireline telephone numbers and respective associated registered geographic locations, said location based call forwarding service including:
  - means for receiving requests for routing instructions from said home location register;
  - means for forming location queries;
  - means for comparing mobile unit locations with registered geographic locations in said subscriber records; and,
  - means for sending location based routing instructions to said home location register;
- and a location finding system, said location finding system monitoring the location of mobile units associated with wireless telephone numbers, said network location finding service having means for responding to location queries from said location based call forwarding service.

10. A location based call forwarding service, which comprises:

- means for storing subscriber records including lists of registered forwarding wireline telephone numbers and respective associated registered geographic locations;
- means for receiving requests for routing instructions from a mobile telephone system home location register;
- means for sending location based routing instructions to said home location register;
- means for sending location queries from a network to a mobile unit location finding system; and
- means for comparing mobile unit locations with registered geographic locations in said subscriber records.

* * * * *